(12) United States Patent
Sun et al.

(10) Patent No.: US 11,778,452 B2
(45) Date of Patent: Oct. 3, 2023

(54) UPLINK CONTROL TRANSMISSION USING PHYSICAL UPLINK CONTROL CHANNEL (PUCCH)

(71) Applicant: HUAWEI TECHNOLOGIES CO., LTD., Guangdong (CN)

(72) Inventors: Hao Sun, Beijing (CN); Lixia Xue, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/672,746

(22) Filed: Nov. 4, 2019

(65) Prior Publication Data

US 2020/0068386 A1 Feb. 27, 2020

Related U.S. Application Data

(63) Continuation of application No. PCT/CN2018/085706, filed on May 4, 2018.

(30) Foreign Application Priority Data

May 4, 2017 (CN) .......................... 201710309784.X

(51) Int. Cl.
*H04W 8/24* (2009.01)
*H04J 13/18* (2011.01)
(Continued)

(52) U.S. Cl.
CPC ............... *H04W 8/24* (2013.01); *H04J 13/18* (2013.01); *H04W 72/0446* (2013.01); *H04W 72/21* (2023.01); *H04W 80/08* (2013.01)

(58) Field of Classification Search
CPC ............... H04W 8/24; H04W 72/0413; H04W 72/0446; H04W 80/08; H04W 80/02;
(Continued)

(56) References Cited

U.S. PATENT DOCUMENTS

| | | | |
|---|---|---|---|
| 2014/0029533 A1* | 1/2014 | Han | ...................... H04W 48/14 370/329 |
| 2014/0036810 A1 | 2/2014 | Harrison et al. | |

(Continued)

FOREIGN PATENT DOCUMENTS

| | | |
|---|---|---|
| CN | 103249147 A | 8/2013 |
| EP | 2608475 A2 | 6/2013 |

OTHER PUBLICATIONS

WO 2018086147 A1 (Year: 2016).*
(Continued)

*Primary Examiner* — Ian N Moore
*Assistant Examiner* — Rushil P. Sampat
(74) *Attorney, Agent, or Firm* — Fish & Richardson P.C.

(57) ABSTRACT

In a communication method, a terminal device obtains a code division multiplexing capability of a physical resource of an uplink control channel, where the code division multiplexing capability is a length of orthogonal cover codes for multiplexing terminal devices in a code division manner on a unit resource in the physical resource of the uplink control channel, and the code division multiplexing capability configured by higher layer signaling. The terminal device further determines the physical resource based on the code division multiplexing capability, and sends uplink control information on the physical resource.

18 Claims, 4 Drawing Sheets

(51) Int. Cl.
*H04W 72/0446* (2023.01)
*H04W 80/08* (2009.01)
*H04W 72/21* (2023.01)

(58) Field of Classification Search
CPC ............... H04W 72/0466; H04J 13/18; H04J 2211/005; H04L 5/0091; H04L 5/0016; H04L 5/0048; H04L 5/0053
See application file for complete search history.

(56) References Cited

U.S. PATENT DOCUMENTS

| | | | | |
|---|---|---|---|---|
| 2019/0090258 | A1* | 3/2019 | Ryu | H04B 7/0632 |
| 2019/0342867 | A1* | 11/2019 | Lin | H04W 72/0446 |
| 2020/0059903 | A1* | 2/2020 | Lin | H04L 5/0091 |
| 2020/0059905 | A1* | 2/2020 | Tang | H04W 74/006 |
| 2020/0128542 | A1* | 4/2020 | Tang | H04W 72/0453 |
| 2021/0336825 | A1* | 10/2021 | Wang | H04L 5/0039 |

OTHER PUBLICATIONS

WO 2018137200 A1 (Year: 2017).*
WO 2018/195965 A1 (Year: 2017).*
Extended European Search Report issued in European Application No. 18794481.4 dated Jun. 8, 2020, 12 pages.
Intel Corporation, "Long PUCCH design aspects," 3GPP TSG RAN WG1 Meeting #88bis, R1-1705031, Spokane, USA, Apr. 3-7, 2017, 5 pages.
LG Electronics, "Configuration of long NR-PUCCH resource," 3GPP TSG RAN WG1 Meeting #88, R1-1702482, Athens, Greece, Feb. 13-17, 2017, 5 pages.
Qualcomm Incorporated, "sPUCCH Format Design," 3GPP TSG RAN WG1 #88bis, R1-1704989, Spokane, USA, Apr. 3-7, 2017, 9 pages.
3GPP TS 36.211 V8.8.0 (Sep. 2009), "3rd Generation Partnership Project;Technical Specification Group Radio Access Network; Evolved Universal Terrestrial Radio Access (E-UTRA); Physical Channels and Modulation (Release 8)," Sep. 2009, 83 pages.
Office Action issued in Korean Application No. 2019-7035757 dated Feb. 4, 2021, 10 pages (with English translation).
Huawei, HiSilicon,"Resource indication of UL control channel",3GPP TSG RAN WG1 Meeting #88,Athens, Greece, R1-1701648, Feb. 13-17, 2017, 4 pages.
Panasonic,"Discussion on resource allocation for uplink control channel",3GPP TSG RAN WG1 Meeting #88,Athens, Greece,R1-1702301, Feb. 13-17, 2017, 2 pages.
PCT International Search Report and Written Opinion in International Application No. PCT/CN2018/085,706, dated Jul. 23, 2018, 13 pages (With English Translation).

* cited by examiner

UPLINK CONTROL TRANSMISSION USING PHYSICAL UPLINK CONTROL CHANNEL (PUCCH)

CROSS-REFERENCE TO RELATED APPLICATIONS

This application is a continuation of International Application No. PCT/CN2018/085706, filed on May 4, 2018, which claims priority to Chinese Patent Application No. 201710309784.X, filed on May 4, 2017. The disclosures of the aforementioned applications are hereby incorporated by reference in their entireties.

TECHNICAL FIELD

This application relates to the communication field, and more specifically, to a communication method, a terminal device, and a network device.

BACKGROUND

In a long term evolution (LTE) system, a physical uplink control channel (PUCCH) occupies one subframe for sending. To be specific, a PUCCH occupies 14 orthogonal frequency division multiplexing (OFDM) symbols or discrete Fourier transform spread orthogonal frequency division multiplexing (DFT-s-OFDM) symbols in time domain. In other words, a quantity of symbols occupied by a PUCCH in time domain is fixed.

In a 5th generation (5G) system, slots that may be used to send a long uplink control channel (long PUCCH) include the following two slot types: an uplink only slot (UL-only) and an uplink centric slot (UL-centric). In addition, a potential downlink control channel, a guard period, and a short uplink control channel may occupy several symbols in a slot. Consequently, the long PUCCH may occupy all or some uplink symbols in the slot for sending. In other words, a quantity of symbols occupied by the long PUCCH in time domain is variable. As a result, a code division multiplexing capability of a physical resource occupied by the long PUCCH varies accordingly.

In such a new scenario in the 5G system, if a resource of a PUCCH with a fixed length is determined in a manner in the LTE system, user equipment may fail to accurately determine a physical resource of a long PUCCH with a variable length. Therefore, how to determine a physical resource occupied by a long PUCCH becomes a technical problem that needs to be resolved.

SUMMARY

This application provides a communication method, a terminal device, and a network device, to accurately determine a resource of an uplink control channel.

According to a first aspect, a communication method is provided, where the method includes:

obtaining, by a terminal device, a code division multiplexing capability of a physical resource occupied by a to-be-sent uplink control channel, where the code division multiplexing capability is a quantity of terminal devices that can be multiplexed in a code division manner on a unit resource in the physical resource, and the code division multiplexing capability is based on a configuration;

determining, by the terminal device, the physical resource based on the code division multiplexing capability; and sending, by the terminal device, uplink control information on the physical resource.

The resource of the uplink control channel can be accurately determined by determining, based on the code division multiplexing capability of the physical resource occupied by the to-be-sent uplink control channel, the physical resource occupied by the uplink control channel.

In some possible implementations, the method further includes:

obtaining, by the terminal device, a first resource index of the physical resource; and obtaining, by the terminal device, a symbol quantity and/or a symbol location of the uplink control channel; and the determining, by the terminal device, the physical resource based on the code division multiplexing capability specifically includes:

determining, by the terminal device, the physical resource based on the first resource index, the code division multiplexing capability, and the symbol quantity and/or the symbol location of the uplink control channel.

The first resource index of the physical resource occupied by the uplink control channel may be semi-statically configured by a network device by using higher layer signaling, or may be notified by using dynamic signaling.

The symbol quantity and/or the symbol location of the uplink control channel are/is a quantity of symbols and/or locations of symbols occupied by the uplink control channel in time domain. The symbol quantity and/or the symbol location of the uplink control channel may be semi-statically configured by the network device by using higher layer signaling, or may be notified by using dynamic signaling.

In some possible implementations, the determining, by the terminal device, the physical resource based on the first resource index, the code division multiplexing capability, and the symbol quantity and/or the symbol location of the uplink control channel specifically includes:

determining, by the terminal device based on the code division multiplexing capability of the physical resource, a quantity of terminal devices that can be multiplexed on the unit resource in the physical resource;

determining, by the terminal device, a second resource index of the physical resource in frequency domain by obtaining a quotient of division of the first resource index by the quantity of terminal devices that can be multiplexed on the unit resource;

determining, by the terminal device, a third resource index of the physical resource in code domain by obtaining a remainder by dividing the first resource index by the quantity of terminal devices that can be multiplexed on the unit resource; and determining, by the terminal device, a fourth resource index of the physical resource in time domain based on the symbol quantity and/or the symbol location of the uplink control channel.

In some possible implementations, that the code division multiplexing capability is based on a configuration includes:

the code division multiplexing capability is configured based on a quantity of symbols occupied by the uplink control channel in time domain.

In some possible implementations, the method further includes:

receiving, by the terminal device, first indication information sent by a network device; and that the code division multiplexing capability is based on a configuration includes:

the code division multiplexing capability is configured based on the first indication information.

In some possible implementations, the method further includes:

receiving, by the terminal device, second indication information sent by the network device, where the second indication information is used to indicate the symbol quantity and/or the symbol location of the uplink control channel.

In some possible implementations, the second indication information includes indexes of the symbol quantity and/or the symbol location of the uplink control channel in a set, and the set is configured by the network device by using higher layer signaling.

In some possible implementations, maximum code division multiplexing capabilities that can be supported by different symbol quantities and/or symbol locations in the set are the same, or slot types corresponding to different symbol quantities and/or symbol locations in the set are the same.

In some possible implementations, the quantity of symbols occupied by the uplink control channel in time domain is 4 to 14, and the quantity of terminal devices that can be multiplexed in a code division manner on the unit resource in the physical resource is one, two, or three times a corresponding quantity of terminal devices that are not multiplexed in a code division manner on the unit resource in the physical resource.

According to a second aspect, a communication method is provided, where the method includes:

determining, by a network device, a physical resource based on a code division multiplexing capability of the physical resource occupied by an uplink control channel to be sent by a terminal device, where the code division multiplexing capability is a quantity of terminal devices that can be multiplexed in a code division manner on a unit resource in the physical resource, and the code division multiplexing capability is based on a configuration; and receiving, by the network device on the physical resource, uplink control information sent by the terminal device.

In this embodiment of the present invention, the resource of the uplink control channel can be accurately determined by determining, based on the code division multiplexing capability of the physical resource occupied by the to-be-sent uplink control channel, the physical resource occupied by the uplink control channel.

In some possible implementations, the method further includes:

obtaining, by the network device, a first resource index of the physical resource; and obtaining, by the network device, a symbol quantity and/or a symbol location of the uplink control channel; and the determining, by a network device, a physical resource based on a code division multiplexing capability of the physical resource occupied by an uplink control channel to be sent by the terminal device includes:

determining, by the network device, the physical resource based on the first resource index, the code division multiplexing capability, and the symbol quantity and/or the symbol location of the uplink control channel.

The first resource index of the physical resource occupied by the uplink control channel may be semi-statically configured by the network device by using higher layer signaling, or may be notified by using dynamic signaling. The symbol quantity and/or the symbol location of the uplink control channel may be semi-statically configured by the network device by using higher layer signaling, or may be notified by using dynamic signaling.

In some possible implementations, the determining, by the network device, the physical resource based on the first resource index, the code division multiplexing capability, and the symbol quantity and/or the symbol location of the uplink control channel specifically includes:

determining, by the network device based on the code division multiplexing capability of the physical resource, a quantity of terminal devices that can be multiplexed on the unit resource in the physical resource;

determining, by the network device, a second resource index of the physical resource in frequency domain by obtaining a quotient of division of the first resource index by the quantity of terminal devices that can be multiplexed on the unit resource;

determining, by the network device, a third resource index of the physical resource in code domain by obtaining a remainder by dividing the first resource index by the quantity of terminal devices that can be multiplexed on the unit resource; and determining, by the network device, a fourth resource index of the physical resource in time domain based on the symbol quantity and/or the symbol location of the uplink control channel.

In some possible implementations, that the code division multiplexing capability is based on a configuration includes:

the code division multiplexing capability is configured based on a quantity of symbols occupied by the uplink control channel in time domain.

In some possible implementations, the method further includes:

sending, by the network device, first indication information; and that the code division multiplexing capability is based on a configuration includes:

the code division multiplexing capability is configured based on the first indication information.

In some possible implementations, the method further includes:

sending, by the network device, second indication information, where the second indication information is used to indicate the symbol quantity and/or the symbol location of the uplink control channel.

In some possible implementations, the second indication information includes indexes of the symbol quantity and/or the symbol location of the uplink control channel in a set, and the set is configured by the network device by using higher layer signaling.

In some possible implementations, maximum code division multiplexing capabilities that can be supported by different symbol quantities and/or symbol locations in the set are the same, or slot types corresponding to different symbol quantities and/or symbol locations in the set are the same.

In some possible implementations, the quantity of symbols occupied by the uplink control channel in time domain is 4 to 14, and the quantity of terminal devices that can be multiplexed in a code division manner on the unit resource in the physical resource is one, two, or three times a quantity of corresponding terminal devices that are not multiplexed in a code division manner on the unit resource in the physical resource.

According to a third aspect, a terminal device is provided, where the terminal device is configured to implement the method in any one of the first aspect or the foregoing possible implementations of the first aspect.

Specifically, the terminal device may include units configured to perform the method in any one of the first aspect or the possible implementations of the first aspect.

According to a fourth aspect, a network device is provided, where the network device is configured to implement the method in any one of the second aspect or the foregoing possible implementations of the second aspect.

Specifically, the network device may include units configured to perform the method in any one of the second aspect or the possible implementations of the second aspect.

According to a fifth aspect, a terminal device is provided, including a processor, a transceiver, and a memory, where the processor, the transceiver, and the memory communicate with each other by using an internal connection channel, the memory is configured to store an instruction, and the processor is configured to execute the instruction stored in the memory, where execution of the instruction stored in the memory enables the terminal device to perform the method in any one of the first aspect or the possible implementations of the first aspect.

According to a sixth aspect, a network device is provided, including a processor, a transceiver, a memory, and a bus system, where the processor, the transceiver, and the memory communicate with each other by using an internal connection channel, the memory is configured to store an instruction, and the processor is configured to execute the instruction stored in the memory, where execution of the instruction stored in the memory enables the network device to perform the method in any one of the second aspect or the possible implementations of the second aspect.

According to a seventh aspect, a computer readable storage medium is provided, where the computer readable storage medium stores a program, and the program enables a terminal device to perform the method in any one of the first aspect or the possible implementations of the first aspect.

According to an eighth aspect, a computer readable storage medium is provided, where the computer readable storage medium stores a program, and the program enables a network device to perform the method in any one of the second aspect or the possible implementations of the second aspect.

DESCRIPTION OF EMBODIMENTS

The following describes technical solutions of this application with reference to the accompanying drawings.

In different communication systems, there may be different network devices in the embodiments of the present invention. For example, a network device may be a base station controller (BSC), a radio network controller (RNC), an evolved NodeB (eNB or e-NodeB) in an LTE system, a NodeB in a WCDMA system, or a base station gNB in a 5G system.

It should be understood that in the embodiments of the present invention, a terminal device may also be referred to as user equipment (UE), a mobile station (Mobile Station, MS), a mobile terminal (Mobile Terminal), or the like. The terminal device may communicate with one or more core networks by using a radio access network (Radio Access Network, RAN). For example, the terminal device may be a mobile phone (or referred to as a "cellular" phone), or a computer having a communication function. For example, the terminal device may also be a portable, pocket-sized, handheld, computer built-in, or in-vehicle mobile apparatus.

It should be noted that locations of N symbols occupied by an uplink control channel in one slot are not limited. For example, in a UL-only slot, a physical uplink control channel may occupy all symbols, or a physical uplink control channel may occupy the $1^{st}$ symbol to the $n^{th}$ symbol, and n is an integer greater than 1 and less than or equal to 14. A UL-centric slot may include one downlink symbol and one guard period (guard period, GP), or include two downlink symbols and one GP. Therefore, in the UL-centric slot, a physical uplink control channel may occupy the $3^{rd}$ symbol to the $m_1^{th}$ symbol, or may occupy the $4^{th}$ symbol to the $m_2^{th}$ symbol, where $m_1$ is an integer greater than 3 and less than or equal to 14, and $m_2$ is an integer greater than 4 and less than or equal to 14.

The uplink control channel in the embodiments of the present invention may be a long PUCCH in a 5G system, or may be another uplink control channel in a future communication system. This is not limited in the embodiments of the present invention. A symbol in the embodiments of the present invention may be an orthogonal frequency division multiplexing (OFDM) symbol, or may be a discrete Fourier transform spread orthogonal frequency division multiplexing (DFT-s-OFDM) symbol, or may be another symbol in a future communication system. This is not limited in the embodiments of the present invention. The symbol in the embodiments of the present invention is a time unit. For example, for a system with a subcarrier spacing of 15 kHz, a symbol length is $1/15000$ seconds.

Figure 1:
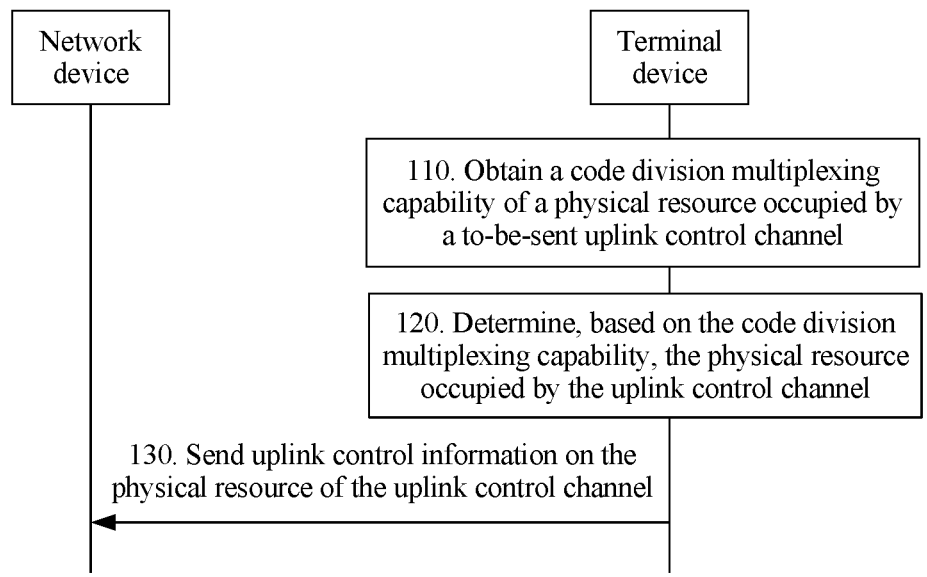
FIG. 1 is a schematic flowchart of a communication method according to an embodiment of the present invention.

FIG. 1 shows a communication method according to an embodiment of the present invention. As shown in FIG. 1, a method 100 includes the following content.

110. A terminal device obtains a code division multiplexing capability of a physical resource occupied by a to-be-sent uplink control channel. The code division multiplexing capability is a quantity of terminal devices that can be multiplexed in a code division manner on a unit resource in the physical resource. The code division multiplexing capability is based on a configuration.

To be specific, the code division multiplexing capability may dynamically or semi-statically vary. For example, the code division multiplexing capability may vary with a quantity of terminal devices that access a network, may vary with a network environment, may periodically vary, or may vary regularly. This is not limited in this embodiment of the present invention. For example, the code division multiplexing capability periodically varies. In a period, a code division multiplexing capability corresponding to a physical resource for sending an uplink control channel by a terminal device is that two terminal devices can be multiplexed. In a next period, a code division multiplexing capability corresponding to sending an uplink control channel by a terminal device is that three terminal devices can be multiplexed.

Figure 2:
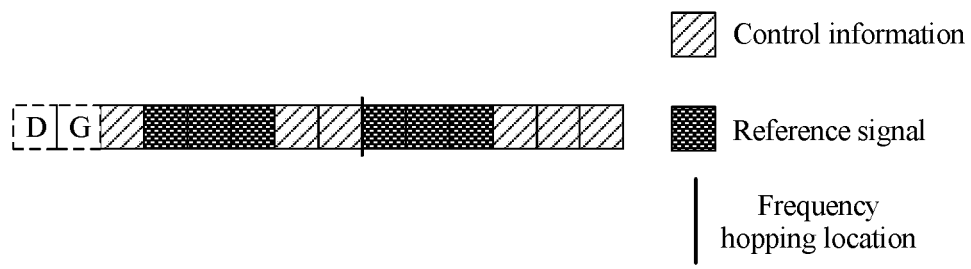
FIG. 2 is a schematic distribution diagram of an uplink control channel according to an embodiment of the present invention.

The code division multiplexing capability in this embodiment may be implemented by superimposing orthogonal cover codes (OCC) on different symbols in time domain, or may be implemented in another manner. For example, as shown in FIG. 2, the uplink control channel is a long PUCCH, the long PUCCH may occupy 12 symbols, and frequency hopping is enabled. Each frequency hopping part includes six symbols, and the six symbols include three reference signal symbols and three data symbols. An OCC with a length of 3 is separately configured on the three reference signal symbols and the three data symbols, so that the quantity of terminal devices that can be multiplexed in a code division manner on the uplink control channel is 3.

120. The terminal device determines, based on the code division multiplexing capability, the physical resource occupied by the uplink control channel.

The physical resource may include a time domain resource, a frequency domain resource, and/or a code domain resource. A basic unit of the physical resource of the uplink control channel in time domain may be one symbol. For example, the uplink control channel may occupy four to 14 symbols. The physical resource of the uplink control channel may include one or more resource blocks (RB) in frequency domain, and one RB may include 12 subcarriers. The physical resource of the uplink control channel may occupy one or more code words in code domain.

130. The terminal device sends uplink control information on the physical resource of the uplink control channel. Correspondingly, a network device receives the uplink control information on the physical resource occupied by the uplink control channel. It should be understood that the network device may also determine, based on the code division multiplexing capability of the unit resource in the physical resource of the uplink control channel, the physical resource occupied by the uplink control channel.

The uplink control information is sent by using the physical resource corresponding to the uplink control channel, and the to-be-sent uplink control channel is an uplink control channel corresponding to to-be-sent uplink control information.

In this embodiment of the present invention, when a length of the uplink control channel is not fixed, the resource of the uplink control channel can be accurately determined by determining, based on the code division multiplexing capability of the physical resource occupied by the to-be-sent uplink control channel, the physical resource occupied by the uplink control channel.

Optionally, the method 100 may further include:
obtaining, by the terminal device, a first resource index of the physical resource occupied by the uplink control channel; and
obtaining, by the terminal device, a symbol quantity and/or a symbol location of the uplink control channel.

Correspondingly, step 120 includes: determining, by the terminal device based on the first resource index, the code division multiplexing capability, and the symbol quantity and/or the symbol location of the uplink control channel, the physical resource occupied by the uplink control channel.

The first resource index of the physical resource occupied by the uplink control channel may be semi-statically configured by the network device by using higher layer signaling, or may be notified by using dynamic signaling. For example, the first resource index of the physical resource occupied by the uplink control channel is a sequence number configured by the network device by using higher layer signaling or dynamic signaling. The network device and the terminal device may uniquely determine, based on the first resource index, the corresponding physical resource for transmitting the uplink control channel.

The symbol quantity and/or the symbol location of the uplink control channel may be semi-statically configured by the network device by using higher layer signaling, or may be notified by using dynamic signaling.

Optionally, in step 120, the determining, by the terminal device based on the first resource index, the code division multiplexing capability, and the symbol quantity and/or the symbol location of the uplink control channel, the physical resource occupied by the uplink control channel specifically includes:

determining, by the terminal device based on the code division multiplexing capability of the physical resource occupied by the to-be-sent uplink control channel, a quantity of terminal devices that can be multiplexed on the unit resource in the physical resource;

determining, by the terminal device, a second resource index of the physical resource in frequency domain by obtaining a quotient of division of the first resource index by the quantity of terminal devices that can be multiplexed on the unit resource;

determining, by the terminal device, a third resource index of the physical resource in code domain by obtaining a remainder by dividing the first resource index by the quantity of terminal devices that can be multiplexed on the unit resource, where after respectively determining an index resource of the physical resource in frequency domain and an index resource of the physical resource in code domain, the terminal device can determine the physical resource; and determining, by the terminal device, a fourth resource index of the physical resource in time domain based on the symbol quantity and/or the symbol location of the uplink control channel.

In this way, the terminal device may determine the physical resource of the uplink control channel.

It should be noted that, alternatively, the terminal device may directly determine the second resource index of the physical resource in frequency domain and the third resource index of the physical resource in code domain based on the first resource index by using a table lookup method. For example, the terminal device may prestore a correspondence between the first resource index and each of the second resource index and the third resource index. For example, if the first resource index is 50, the index directly corresponds to a case that the second resource index is 2 and the third resource index is 13. If the first resource index is 51, the index directly corresponds to a case that the second resource index is 2 and the third resource index is 14.

It should be understood that a method used by the network device to determine the physical resource occupied by the uplink control channel is the same as the foregoing method of the terminal device, and details are not described herein again.

It should be noted that, on the unit resource, in addition to performing multiplexing in a code division multiplexing manner, a plurality of terminal devices may perform multiplexing by using different cyclic shifts in frequency domain. Therefore, the quantity of terminal devices that can be multiplexed on the unit resource is a quantity of terminal devices that use a code division multiplexing manner on the unit resource and that are supported by the different cyclic shifts in frequency domain.

For example, on the unit resource, a quantity of terminal devices supported by different cyclic shifts in frequency domain is 6, and a quantity of terminal devices that can be multiplexed is 3. In this case, the quantity of terminal devices that can be multiplexed on the unit resource is 18.

When the first resource index configured by the network device is 50, the second resource index is a quotient 2 of division of 50 by 18 (when a start index is 0, the second resource index is 2; or when a start index is 1, the second resource index is 3), and the third resource index is a remainder 14 obtained by dividing 50 by 18 (when the start index is 0, the third resource index is 13; or when the start index is 1, the corresponding second resource index is 14).

Optionally, that the code division multiplexing capability of the physical resource occupied by the uplink control channel is based on a configuration includes: the code division multiplexing capability of the physical resource occupied by the uplink control channel is configured based on a quantity of symbols occupied by the uplink control channel in time domain. For example, a correspondence between the code division multiplexing capability and the quantity of symbols occupied by the uplink control channel in time domain may be predefined or preconfigured. For example, a code division multiplexing capability corresponding to four to seven symbols is one user or two users, and a code division multiplexing capability corresponding to eight to 14 symbols is two users or three users.

In this way, the terminal device can determine the code division multiplexing capability based on the quantity of symbols occupied by the uplink control channel in time domain and the correspondence.

Optionally, the method 100 may further include: sending, by the network device, first indication information. Correspondingly, that the code division multiplexing capability of the physical resource occupied by the uplink control channel is based on a configuration includes: the code division multiplexing capability of the physical resource occupied by the uplink control channel is configured based on the first indication information. For example, the first indication information is used to indicate the code division multiplexing capability. Correspondingly, the terminal device receives the first indication information. The terminal device may obtain the code division multiplexing capability based on the first indication information.

The first indication information may be carried in higher layer signaling or system information. The higher layer signaling may be radio resource control (RRC) or the like, and the system information may be a master information block (MIB), a system information block (SIB), or the like.

In other words, the code division multiplexing capability may be alternatively configured by the network device.

Optionally, the method 100 may further include: sending, by the network device, second indication information, where the second indication information is used to indicate the symbol quantity and/or the symbol location of the uplink control channel in time domain. The terminal device receives the second indication information.

The symbol location of the uplink control channel in time domain may be locations of all symbols occupied by the uplink control channel in time domain, or may be a location of a preset symbol (such as a start symbol or an end symbol) in symbols occupied by the uplink control channel in time domain.

In some embodiments, the second indication information is used to indicate the quantity of symbols occupied by the uplink control channel in time domain. The symbol location (such as a start location or an end location) of the uplink control channel may be predefined or preconfigured, and the terminal device may determine a time domain resource of the uplink control channel based on the quantity of symbols that is indicated by the second indication information.

In some embodiments, the second indication information is used to indicate the symbol locations of all the symbols occupied by the uplink control channel in time domain. The terminal device may determine a time domain resource of the uplink control channel based on the symbol locations that are of all the symbols and that are indicated by the second indication information.

In some embodiments, the second indication information is used to indicate the symbol quantity and/or the symbol location of the uplink control channel in time domain, where the symbol location is a location of a preset symbol in symbols occupied by the uplink control channel in time domain. The terminal device may determine a time domain resource of the uplink control channel based on the symbol quantity and/or the symbol location that are indicated by the second indication information.

Optionally, the second indication information includes indexes of the symbol quantity and/or the symbol location of the uplink control channel in a set, and the set is configured by the network device by using higher layer signaling.

To be specific, the set may include a plurality of symbol quantities of the uplink control channel, the set may include a plurality of symbol locations of the uplink control channel, or the set may include a combination of a plurality of symbol quantities and symbol locations of the uplink control channel.

It should be noted that the first indication information and the second indication information may be separately sent, or may be simultaneously sent. For example, the first indication information and the second indication information may be carried in different higher layer signaling or configuration information, or may be carried in different fields of same higher layer signaling or configuration information.

Optionally, the network device may further send third indication information, where the third indication information is used to indicate the set. The third indication information may be carried in higher layer signaling.

Optionally, maximum code division multiplexing capabilities that can be supported by the symbol quantities and/or the symbol locations in the set are the same, or slot types corresponding to the symbol quantities and/or the symbol locations in the set are the same.

With reference to FIG. 3 to FIG. 6, the following uses distribution of symbols of the uplink control channel in a slot as an example for description.

Figure 3:
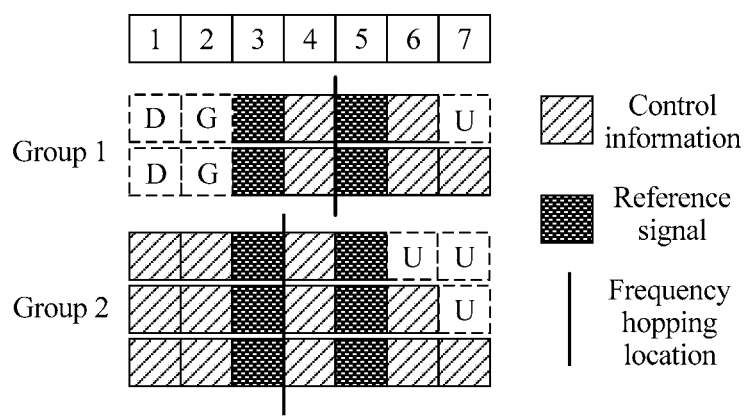
FIG. 3 is a schematic distribution diagram of symbols of an uplink control channel according to an embodiment of the present invention.

If the maximum code division multiplexing capabilities that can be supported by the symbol quantities in the set are the same, the symbol quantities in the set may be {4, 5, 6, 7}, in other words, four to seven symbols are grouped into one group; and the symbol quantity in the set supports 1×the code division multiplexing capability. As shown in FIG. 3, in a slot with a length of seven symbols, the uplink control channel occupies four to seven symbols. Optionally, there is a correspondence between the symbol quantity and/or the symbol location in the set. For example, a start location that is of the uplink control channel and that corresponds to the symbol quantity 4 or 5 may be a third symbol in the slot (as shown in a group 1 in FIG. 3), or a start location that is of the uplink control channel and that corresponds to the symbol quantity 5, 6, or 7 may be a first symbol (as shown in a group 2 in FIG. 3).

Figure 4:
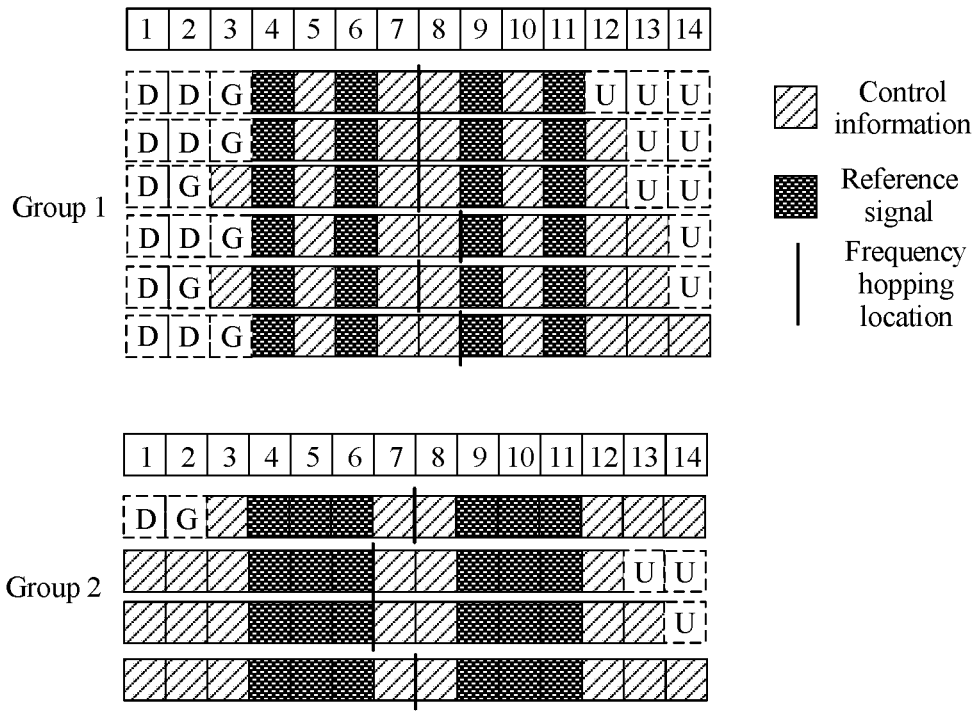
FIG. 4 is a schematic distribution diagram of symbols of an uplink control channel according to another embodiment of the present invention.

Alternatively, if the maximum code division multiplexing capabilities that can be supported by the symbol quantities in the set are the same, the set may be {8, 9, 10, 11}, in other words, eight to 11 symbols are grouped into one group; and the symbol quantity in the set supports 2×the code division multiplexing capability. As shown in FIG. 4, in a slot with a length of 14 symbols, the uplink control channel occupies eight to 11 symbols. Optionally, there is a correspondence between the symbol quantity and/or the symbol location in the set. For example, a start location that is of the uplink control channel and that corresponds to the symbol quantity 8, 9, 10, or 11 is a fourth symbol in the slot, or a start location that is of the uplink control channel and that corresponds to the symbol quantity 10 or 11 may be a third symbol in the slot.

Alternatively, if the maximum code division multiplexing capabilities that can be supported by the symbol quantities in the set are the same, the symbol quantities in the set may be {12, 13, 14}, in other words, 12 to 14 symbols are grouped into one group; and the symbol quantity in the set supports 3×the code division multiplexing capability. As shown in FIG. 4, in a slot with a length of 14 symbols, the uplink control channel occupies 12 to 14 symbols. Optionally, there is a correspondence between the symbol quantity and/or the symbol location in the set. For example, a start location corresponding to the symbol quantity 12, 13, or 14 is a first symbol in the slot, or a start location corresponding to the symbol quantity 12 may be a third symbol in the slot.

Figure 5:
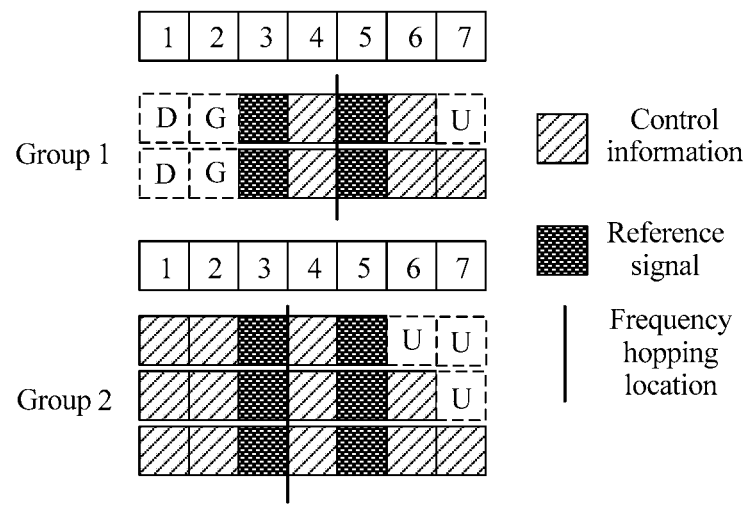
FIG. 5 is a schematic distribution diagram of symbols of an uplink control channel according to another embodiment of the present invention.

If the slot types corresponding to the symbol quantities in the set are the same, the symbol quantities in the set may be {4, 5}, in other words, four or five symbols are grouped into one group; and the slot type corresponding to the symbol quantity in the set is an uplink centric slot (UL-Centric). As shown in FIG. 5, in a slot with a length of seven symbols, the uplink control channel occupies four or five symbols. Optionally, there is a correspondence between the symbol quantity and/or the symbol location in the set. For example, a start location that is of the uplink control channel and that corresponds to the symbol quantity 4 or 5 is a third symbol in the slot.

Alternatively, if the slot types corresponding to the symbol quantities in the set are the same, the symbol quantities in the set may be {5, 6, 7}, in other words, five to seven symbols are grouped into one group; and the slot type corresponding to the symbol quantity in the set is an uplink only slot (UL-Only). As shown in FIG. 5, in a slot with a length of seven symbols, the uplink control channel occupies five to seven symbols. Optionally, there is a correspondence between the symbol quantity and/or the symbol location in the set. For example, a start location that is of the uplink control channel and that corresponds to the symbol quantity 5, 6, or 7 is a first symbol in the slot.

Figure 6:
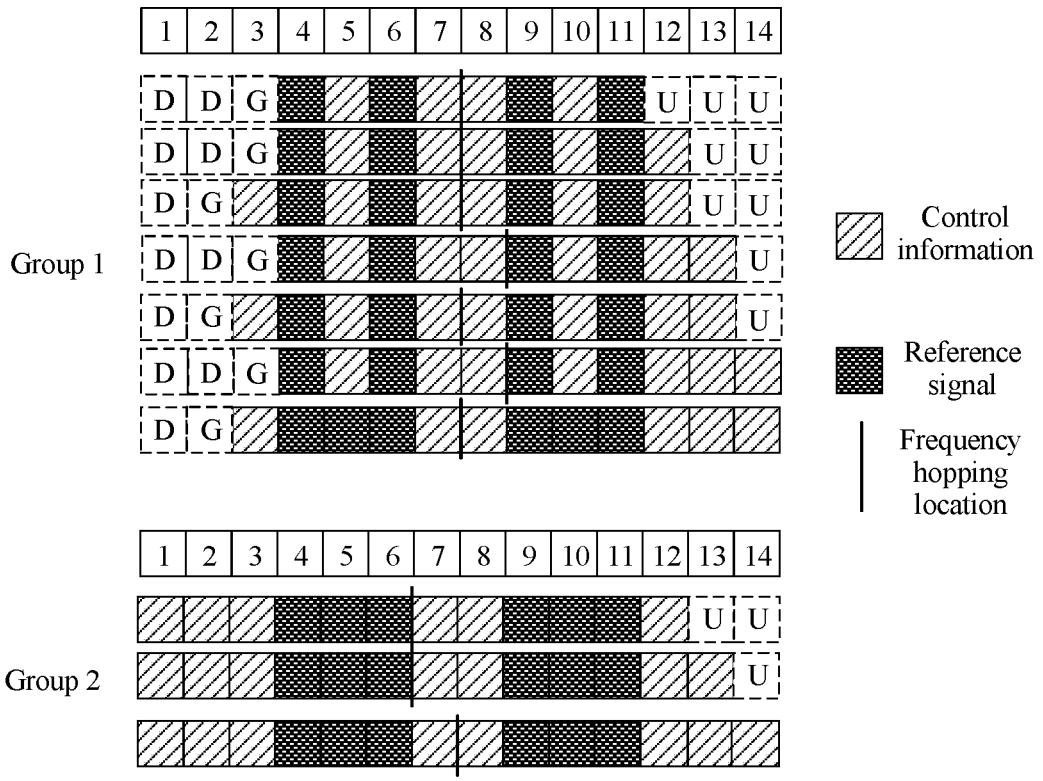
FIG. 6 is a schematic distribution diagram of symbols of an uplink control channel according to another embodiment of the present invention.

Alternatively, if the slot types corresponding to the symbol quantities in the set are the same, the symbol quantities in the set may be {8, 9, 10, 11, 12}, in other words, eight to 12 symbols are grouped into one group; and the slot type corresponding to the symbol quantity in the set is an uplink centric slot (UL-Centric). As shown in FIG. 6, in a slot with a length of 14 symbols, the uplink control channel occupies eight to 12 symbols. Optionally, there is a correspondence between the symbol quantity and/or the symbol location in the set. For example, a start location corresponding to the symbol quantity 8, 9, 10, or 11 is a fourth symbol in the slot, or a start location that is of the uplink control channel and that corresponds to the symbol quantity 10, 11, or 12 may be a third symbol in the slot.

Alternatively, if the slot types corresponding to the symbol quantities in the set are the same, the symbol quantities in the set may be {12, 13, 14}, in other words, 12 to 14 symbols are grouped into one group; and the slot type corresponding to the symbol quantity in the set is an uplink only slot (UL-Only). As shown in FIG. 6, in a slot with a length of 14 symbols, the uplink control channel occupies 12 to 14 symbols. Optionally, there is a correspondence between the symbol quantity and/or the symbol location in the set. For example, a start location that is of the uplink control channel and that corresponds to the symbol quantity 12, 13, or 14 is a first symbol in the slot.

In FIG. 3 to FIG. 6, the uplink control channel includes control information and a reference signal. A part of symbols before a frequency hopping location occupy a same frequency domain resource, a part of symbols after the frequency hopping location occupy a same frequency domain resource, and the two parts before and after the frequency hopping location occupy different frequency domain resources.

In FIG. 3 to FIG. 6, U indicates a symbol occupied by a short PUCCH or a sounding reference signal (Sounding Reference Signal, SRS), D indicates a symbol occupied by a downlink control channel, and G indicates a guard period.

Optionally, the quantity of symbols occupied by the uplink control channel in time domain is 4 to 14, and the quantity of terminal devices that can be multiplexed in a code division manner on the unit resource in the physical resource is one, two, or three times a quantity of corresponding terminal devices that are not multiplexed in a code division manner on the unit resource in the physical resource.

The foregoing describes the communication method according to the embodiments of the present invention. The following describes a terminal device and a network device according to the embodiments of the present invention with reference to FIG. 7 to FIG. 10.

Figure 7:
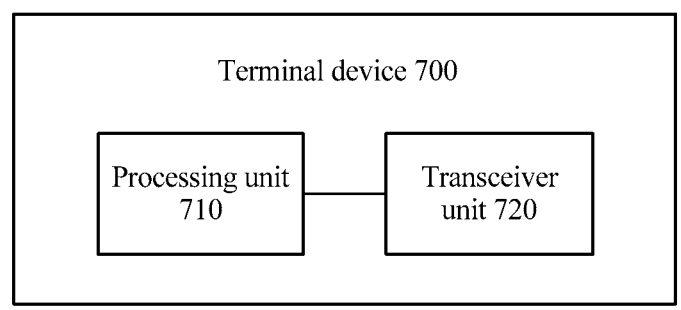
FIG. 7 is a schematic structural diagram of a terminal device according to an embodiment of the present invention.

FIG. 7 is a schematic structural diagram of a terminal device 700 according to an embodiment of the present invention. As shown in FIG. 7, the terminal device 700 includes a processing unit 710 and a transceiver unit 720.

The processing unit 710 is configured to obtain a code division multiplexing capability of a physical resource occupied by a to-be-sent uplink control channel, where the code division multiplexing capability is a quantity of terminal devices that can be multiplexed in a code division manner on a unit resource in the physical resource, and the code division multiplexing capability is based on a configuration.

The processing unit 710 is further configured to determine the physical resource based on the code division multiplexing capability.

The transceiver unit 720 is configured to send uplink control information on the physical resource determined by the processing unit 710.

In this embodiment of the present invention, the resource of the uplink control channel can be accurately determined by determining, based on the code division multiplexing capability of the physical resource occupied by the to-besent uplink control channel, the physical resource occupied by the uplink control channel.

Optionally, the processing unit 710 is further configured to: obtain a first resource index of the physical resource, and obtain a symbol quantity and/or a symbol location of the uplink control channel. Correspondingly, the processing unit 710 is specifically configured to determine the physical resource based on the first resource index, the code division multiplexing capability, and the symbol quantity and/or the symbol location of the uplink control channel.

Optionally, the processing unit 710 is specifically configured to:

determine, based on the code division multiplexing capability of the physical resource, a quantity of terminal devices that can be multiplexed on the unit resource in the physical resource;

determine a second resource index of the physical resource in frequency domain by obtaining a quotient of division of the first resource index by the quantity of terminal devices that can be multiplexed on the unit resource;

determine a third resource index of the physical resource in code domain by obtaining a remainder by dividing the first resource index by the quantity of terminal devices that can be multiplexed on the unit resource; and determine a fourth resource index of the physical resource in time domain based on the symbol quantity and/or the symbol location of the uplink control channel.

Optionally, the transceiver unit 720 is further configured to receive first indication information sent by a network device. Correspondingly, that the code division multiplexing capability of the physical resource occupied by the uplink control channel is based on a configuration includes: The code division multiplexing capability of the physical resource occupied by the uplink control channel is configured based on the first indication information. For example, the first indication information is used to indicate the code division multiplexing capability.

Optionally, the transceiver unit 720 is further configured to receive second indication information sent by the network device, where the second indication information is used to indicate the symbol quantity and/or the symbol location of the uplink control channel.

It should be understood that the terminal device 700 in this embodiment of the present invention may correspond to the terminal device in the communication method in the embodiment of the present invention. In addition, the foregoing and other operations and/or functions of the units in the terminal device 700 are respectively intended to implement corresponding procedures of the method shown in FIG. 1. For brevity, details are not described herein.

Figure 8:
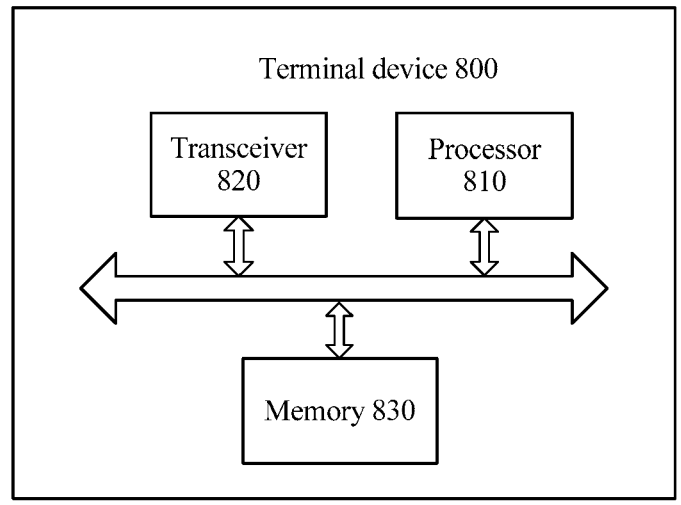
FIG. 8 is a schematic structural diagram of a terminal device according to another embodiment of the present invention.

FIG. 8 is a schematic structural diagram of a terminal device 800 according to another embodiment of the present invention. As shown in FIG. 8, the terminal device 800 includes a processor 810, a transceiver 820, and a memory 830. The processor 810, the transceiver 820, and the memory 830 communicate with each other by using an internal connection channel, and transfer a control signal and/or a data signal. The memory 830 is configured to store an instruction, and the processor 810 is configured to execute the instruction stored in the memory 830. The transceiver 820 is configured to receive a signal under control of the processor 810.

Specifically, the transceiver 820 is configured to implement a function of the transceiver unit 720 in the terminal device 700 shown in FIG. 7. The processor 810 is configured to implement a function of the processing unit 710 in the terminal device 700 shown in FIG. 7. For brevity, details are not described herein.

It should be understood that the terminal device 800 in this embodiment of the present invention may correspond to the terminal device in the communication method in the embodiment of the present invention and the terminal device 700 in the embodiment of the present invention. In addition, the foregoing and other operations and/or functions of units in the terminal device 800 are respectively intended to implement corresponding procedures of the method shown in FIG. 1. For brevity, details are not described herein.

Figure 9:
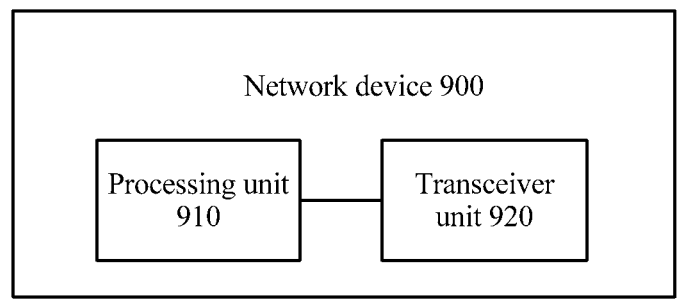
FIG. 9 is a schematic structural diagram of a network device according to an embodiment of the present invention.

FIG. 9 is a schematic structural diagram of a network device 900 according to an embodiment of the present invention. As shown in FIG. 9, the network device 900 may include a processing unit 910 and a transceiver unit 920.

The processing unit 910 is configured to determine a physical resource based on a code division multiplexing capability of the physical resource occupied by an uplink control channel to be sent by a terminal device, where the code division multiplexing capability is a quantity of terminal devices that can be multiplexed in a code division manner on a unit resource in the physical resource, and the code division multiplexing capability is based on a configuration.

The transceiver unit 920 is configured to receive, on the physical resource determined by the processing unit 910, uplink control information sent by the terminal device.

In this embodiment of the present invention, the resource of the uplink control channel can be accurately determined by determining, based on the code division multiplexing capability of the physical resource occupied by the to-be-sent uplink control channel, the physical resource occupied by the uplink control channel.

Optionally, the processing unit 910 is further configured to: obtain a first resource index of the physical resource, and obtain a symbol quantity and/or a symbol location of the uplink control channel. Correspondingly, the processing unit 910 is specifically configured to determine the physical resource based on the first resource index, the code division multiplexing capability, and the symbol quantity and/or the symbol location of the uplink control channel.

Optionally, the processing unit 910 is specifically configured to:

determine, based on the code division multiplexing capability of the physical resource, a quantity of terminal devices that can be multiplexed on the unit resource in the physical resource;

determine a second resource index of the physical resource in frequency domain by obtaining a quotient of division of the first resource index by the quantity of terminal devices that can be multiplexed on the unit resource;

determine a third resource index of the physical resource in code domain by obtaining a remainder by dividing the first resource index by the quantity of terminal devices that can be multiplexed on the unit resource; and determine a fourth resource index of the physical resource in time domain based on the symbol quantity and/or the symbol location of the uplink control channel.

Optionally, the transceiver unit 920 is further configured to send first indication information. Correspondingly, that the code division multiplexing capability of the physical resource occupied by the uplink control channel is based on a configuration includes: The code division multiplexing capability of the physical resource occupied by the uplink control channel is configured based on the first indication information.

For example, the first indication information is used to indicate the code division multiplexing capability.

Optionally, the transceiver unit 920 is further configured to send second indication information, where the second indication information is used to indicate the symbol quantity and/or the symbol location of the uplink control channel.

It should be understood that the network device 900 in this embodiment of the present invention may correspond to the network device in the communication method in the embodiment of the present invention. In addition, the foregoing and other operations and/or functions of units in the network device 900 are respectively intended to implement corresponding procedures of the method shown in FIG. 1. For brevity, details are not described herein.

Figure 10:
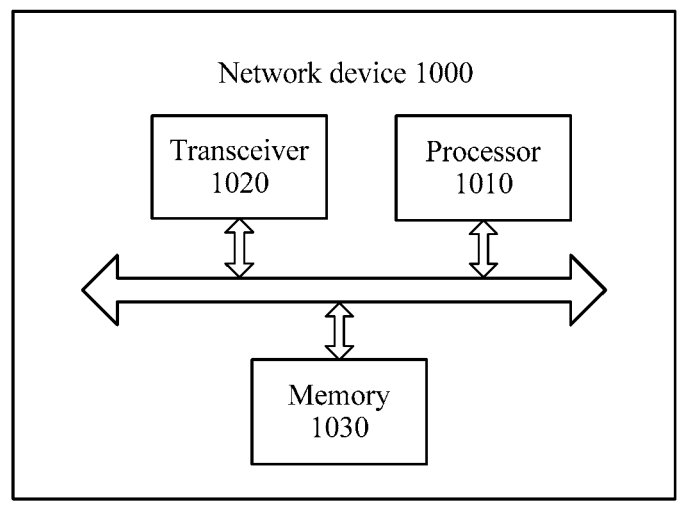
FIG. 10 is a schematic structural diagram of a network device according to another embodiment of the present invention.

FIG. 10 is a schematic structural diagram of a network device 1000 according to another embodiment of the present invention. As shown in FIG. 10, the network device 1000 includes a processor 1010, a transceiver 1020, and a memory 1030. The processor 1010, the transceiver 1020, and the memory 1030 communicate with each other by using an internal connection channel, and transfer a control signal and/or a data signal. The memory 1030 is configured to store an instruction, and the processor 1010 is configured to execute the instruction stored in the memory 1030. The transceiver 1020 is configured to send a signal under control of the processor 1010.

Specifically, the transceiver 1020 is configured to implement a function of the transceiver 920 in the network device 900 shown in FIG. 9. The processor 1010 is configured to implement a function of the processing unit 910 in the network device 900 shown in FIG. 9. For brevity, details are not described herein.

It should be understood that the network device 1000 in this embodiment of the present invention may correspond to the network device in the communication method in the embodiment of the present invention and the network device 900 in the embodiment of the present invention. In addition, the foregoing and other operations and/or functions of units in the network device 1000 are respectively intended to implement corresponding procedures of the method shown in FIG. 1. For brevity, details are not described herein.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for ease and brevity of description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of the embodiments of the present invention essentially, or the part contributing to the prior art, or some of the technical solutions may be embodied in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving, by a terminal device, first indication information and second indication information carried in different fields of higher layer signaling, wherein the first indication information is a length of orthogonal cover codes (OCCs) for multiplexing terminal devices in a code division manner on a unit resource of a physical resource of an uplink control channel, wherein the physical resource comprises at least one data symbol and at least one reference signal symbol the terminal devices are multiplexed in a code division manner by superimposing the OCCs on the at least one data symbol of the physical resource in a time domain, and wherein the second indication information indicates a symbol quantity of the uplink control channel and a start symbol location of the uplink control channel;
   determining, by the terminal device, the physical resource based on a first resource index identified by the terminal device, the first indication information and the second indication information;

sending, by the terminal device, uplink control information and a reference signal on the physical resource of the uplink control channel; and receiving, by the terminal device, third indication information, wherein the third indication information indicates a set of at least one symbol quantity or at least one symbol location of the uplink control channel, and wherein the second indication information indicates indexes of the at least one symbol quantity of the uplink control channel and the start symbol location of the uplink control channel in the set.

2. The method according to claim 1, wherein determining the physical resource comprises:

determining, based on the code division multiplexing capability of the physical resource, a quantity of the terminal devices multiplexed on the unit resource in the physical resource;

determining a second resource index of a physical resource in a frequency domain based on a quotient of the first resource index divided by the quantity of the terminal devices;

determining a third resource index of the physical resource in a code domain based on a remainder of the first resource index divided by the quantity of the terminal devices; and determining a fourth resource index of the physical resource in the time domain based on the symbol quantity of the uplink control channel and the start symbol location of the uplink control channel.

3. The method according to claim 1, wherein the second indication information comprises the indexes of the at least one symbol quantity of the uplink control channel and at least one start symbol location of the uplink control channel in the set, and the set is configured by a network device by using higher layer signaling.

4. The method according to claim 3, wherein at least one of maximum code division multiplexing capabilities supported by different symbol quantities or different symbol locations in the set are the same, or slot types corresponding to different symbol quantities or different symbol locations in the set are the same.

5. The method according to claim 1, wherein a quantity of symbols occupied by the uplink control channel in a time domain is between 4 and 14, and a quantity of terminal devices multiplexed in a code division manner on the unit resource in the physical resource is one of one, two, or three times a quantity of corresponding terminal devices that are not multiplexed in a code division manner on the unit resource in the physical resource.

6. A communication apparatus, comprising:

a storage medium including executable instructions; and at least one processor;

wherein the executable instructions, when executed by the at least one processor, cause the apparatus to:

receive first indication information and second indication information carried in different fields of higher layer signaling, wherein the first indication information is a length of orthogonal cover codes (OCCs) for multiplexing terminal devices in a code division manner on a unit resource of a physical resource of an uplink control channel, wherein the physical resource comprises at least one data symbol and at least one reference signal symbol, wherein the terminal devices are multiplexed in a code division manner by superimposing the OCCs on the at least one data symbol of the physical resource in a time domain, and wherein the second indication information indicates a symbol quantity of the uplink control channel and a start symbol location of the uplink control channel;

determine the physical resource based on a first resource index identified by the communication apparatus, the first indication information and the second indication information;

send uplink control information and a reference signal on the physical resource of the uplink control channel; and receive third indication information, wherein the third indication information indicates a set of at least one symbol quantity of the uplink control channel or at least one start symbol location of the uplink control channel, and wherein the second indication information indicates indexes of the at least one symbol quantity of the uplink control channel and at least one the start symbol location of the uplink control channel in the set.

7. The apparatus according to claim 3, wherein determining the physical resource comprises:

determining, based on the code division multiplexing capability of the physical resource, a quantity of the terminal devices multiplexed on the unit resource in the physical resource;

determining a second resource index of a physical resource in a frequency domain based on a quotient of the first resource index divided by the quantity of the terminal devices;

determining a third resource index of the physical resource in a code domain based on a remainder of the first resource index divided by the quantity of the terminal devices; and determining a fourth resource index of the physical resource in the time domain based on the symbol quantity of the uplink control channel and the start symbol location of the uplink control channel.

8. The apparatus according to claim 6, wherein the second indication information comprises the indexes of the at least one symbol quantity of the uplink control channel and the at least one start symbol location of the uplink control channel in the set, and the set is configured by a network device by using higher layer signaling.

9. The apparatus according to claim 6, wherein at least one maximum code division multiplexing capabilities supported by different symbol quantities or different symbol locations in the set are the same, or slot types corresponding to different symbol quantities or different symbol locations in the set are the same.

10. The apparatus according to claim 6, wherein a quantity of symbols occupied by the uplink control channel in a time domain is between 4 and 14, and a quantity of terminal devices multiplexed in a code division manner on the unit resource in the physical resource is one of one, two, or three times a quantity of corresponding terminal devices that are not multiplexed in a code division manner on the unit resource in the physical resource.

11. A communication method, comprising:

sending, by a network device, higher layer signaling carrying first indication information and second indication information in different fields, wherein the first indication information is a length of orthogonal cover codes (OCCs) for multiplexing terminal devices in a code division manner on a unit resource of a physical resource of an uplink control channel, wherein the physical resource comprises at least one data symbol and at least one reference signal symbol, wherein the terminal devices are multiplexed in a code division manner by superimposing the OCCs on the at least one data symbol of the physical resource in a time domain, and wherein the second indication information indicates a symbol quantity of the uplink control channel and a start symbol location of the uplink control channel;

sending, by the network device, a first resource index of the physical resource; wherein the first resource index, the first indication information and the second indication information are used to determine the physical resource by a terminal device;

receiving uplink control information and a reference signal on the physical resource of the uplink control channel; and sending third indication information, wherein the third indication information indicates a set of at least one symbol quantity or at least one symbol location of the uplink control channel, and wherein the second indication information indicates indexes of the at least one symbol quantity of the uplink control channel and the start symbol location of the uplink control channel in the set.

12. The method according to claim 11, further comprising:
sending, by the network device, third indication information, wherein the third indication information indicates a set of at least one symbol quantity or at least one symbol location of the uplink control channel, and wherein the second indication information indicates indexes of the at least one symbol quantity of the uplink control channel and the start symbol location of the uplink control channel in the set.

13. The method according to claim 12, wherein the second indication information comprises the indexes of the at least one symbol quantity of the uplink control channel and at least one start symbol location of the uplink control channel in the set, and the set is configured by the network device by using higher layer signaling.

14. The method according to claim 13, wherein at least one of maximum code division multiplexing capabilities supported by different symbol quantities or different symbol locations in the set are the same, or slot types corresponding to different symbol quantities or different symbol locations in the set are the same.

15. A communication apparatus, comprising:
a storage medium including executable instructions; and
at least one processor;
wherein the executable instructions, when executed by the at least one processor, cause the apparatus to:
send higher layer signaling carrying first indication information and second indication information in different fields, wherein the first indication information is a length of orthogonal cover codes (OCCs) for multiplexing terminal devices in a code division manner on a unit resource of a physical resource of an uplink control channel, wherein the physical resource comprises at least one data symbol and at least one reference signal symbol, the terminal devices are multiplexed in a code division manner by superimposing the OCCs on the at least one data symbol of the physical resource in a time domain, and wherein the second indication information indicates a symbol quantity of the uplink control channel and a start symbol location of the uplink control channel;

send a first resource index of the physical resource, wherein the first resource index, the first indication information and the second indication information are used to determine the physical resource by a terminal device; and receive uplink control information and a reference signal on the physical resource of the uplink control channel; and send third indication information, wherein the third indication information indicates a set of at least one symbol quantity or at least one symbol location of the uplink control channel, and wherein the second indication information indicates indexes of the at least one symbol quantity of the uplink control channel and the start symbol location of the uplink control channel in the set.

16. The apparatus according to claim 15, wherein the executable instructions, when executed by the at least one processor, further cause the apparatus to:
send third indication information, wherein the third indication information indicates a set of at least one symbol quantity of the uplink control channel and at least one start symbol location of the uplink control channel, and wherein the second indication information indicates indexes of the at least one symbol quantity of the uplink control channel and the at least one start symbol location of the uplink control channel in the set.

17. The apparatus according to claim 16, wherein the second indication information comprises the indexes of the at least one symbol quantity of the uplink control channel and the at least one start symbol location of the uplink control channel in the set, and the set is configured by the communication apparatus by using higher layer signaling.

18. The apparatus according to claim 15, wherein at least one maximum code division multiplexing capabilities supported by different symbol quantities or different symbol locations in the set are the same, or slot types corresponding to different symbol quantities or different symbol locations in the set are the same.

* * * * *

UNITED STATES PATENT AND TRADEMARK OFFICE
CERTIFICATE OF CORRECTION

PATENT NO. : 11,778,452 B2
APPLICATION NO. : 16/672746
DATED : October 3, 2023
INVENTOR(S) : Hao Sun and Lixia Xue It is certified that error appears in the above-identified patent and that said Letters Patent is hereby corrected as shown below:

In the Claims

Column 18, Line 21, Claim 7, please delete "claim 3," and insert therefore -- claim 6, --.

Signed and Sealed this
Seventh Day of May, 2024

Katherine Kelly Vidal
*Director of the United States Patent and Trademark Office*